US008007058B2

(12) United States Patent
Bessette

(10) Patent No.: US 8,007,058 B2
(45) Date of Patent: Aug. 30, 2011

(54) TRACTION ASSEMBLY WITH ENDLESS TRACK HAVING VARIABLE GROUND-CONTACTING AREA

(75) Inventor: Robert Bessette, St-Charles-de-Drummond (CA)

(73) Assignee: Soucy International Inc., Drummondville, Quebec (CA)

(*) Notice: Subject to any disclaimer, the term of this patent is extended or adjusted under 35 U.S.C. 154(b) by 115 days.

(21) Appl. No.: 12/366,193

(22) Filed: Feb. 5, 2009

(65) Prior Publication Data
US 2009/0194345 A1 Aug. 6, 2009

(30) Foreign Application Priority Data
Feb. 6, 2008 (CA) .................................. 2619542

(51) Int. Cl.
B62D 55/275 (2006.01)
(52) U.S. Cl. ..................... 305/178; 305/44; 180/9.44
(58) Field of Classification Search .................. 305/120, 305/124, 129–130, 135, 165–181, 44, 46, 305/191, 51, 53, 60; 180/184–185, 9.1, 9.21, 180/9.38, 9, 9.44, 9.46
See application file for complete search history.

(56) References Cited

U.S. PATENT DOCUMENTS

| 4,448,273 | A | * | 5/1984 | Barbieri | 180/9.21 |
|---|---|---|---|---|---|
| 6,109,705 | A | * | 8/2000 | Courtemanche | 305/178 |
| 2007/0240917 | A1 | * | 10/2007 | Duceppe | 180/9.21 |
| 2009/0090570 | A1 | * | 4/2009 | Zuchoski et al. | 180/9.1 |
| 2010/0108421 | A1 | * | 5/2010 | Zuchoski et al. | 180/185 |

FOREIGN PATENT DOCUMENTS

| JP | 52-2925 | * | 1/1977 |
|---|---|---|---|
| JP | 58-71275 | * | 4/1983 |

* cited by examiner

Primary Examiner — Jason R Bellinger
(74) Attorney, Agent, or Firm — François Cartier; Robert Brouillette; Brouillette & Partners

(57) ABSTRACT

The present invention generally provides a wheel replacing traction assembly which uses, for propulsion, a longitudinally extending endless track disposed around and cooperating with a sprocket wheel, idler and/or road wheels and a supporting frame. The endless track generally comprises an inner wheel-engaging surface and an outer ground-engaging surface, the latter being provided with traction lugs. The outer surface further comprises at least one laterally extending portion which also extends along the circumference of the track; the traction lugs located on this laterally extending portion being generally higher than the traction lugs located on the remainder of the outer surface.

17 Claims, 6 Drawing Sheets

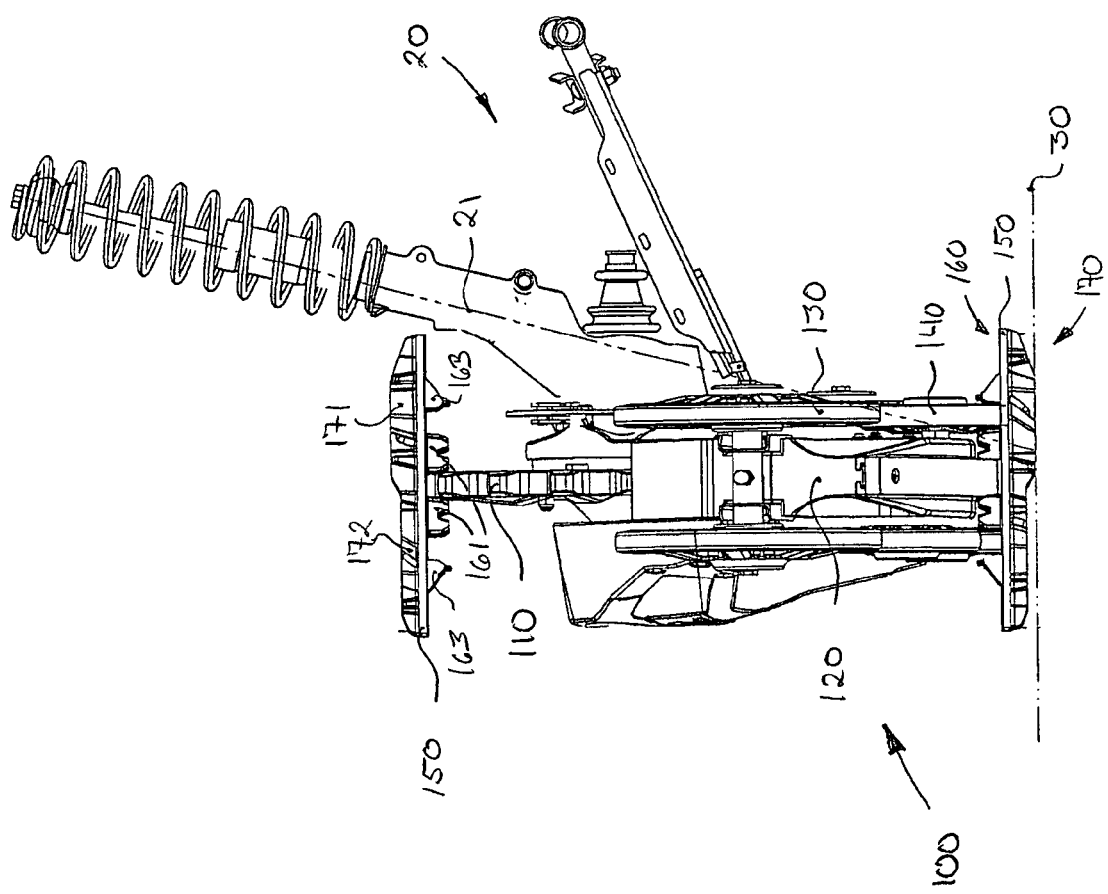

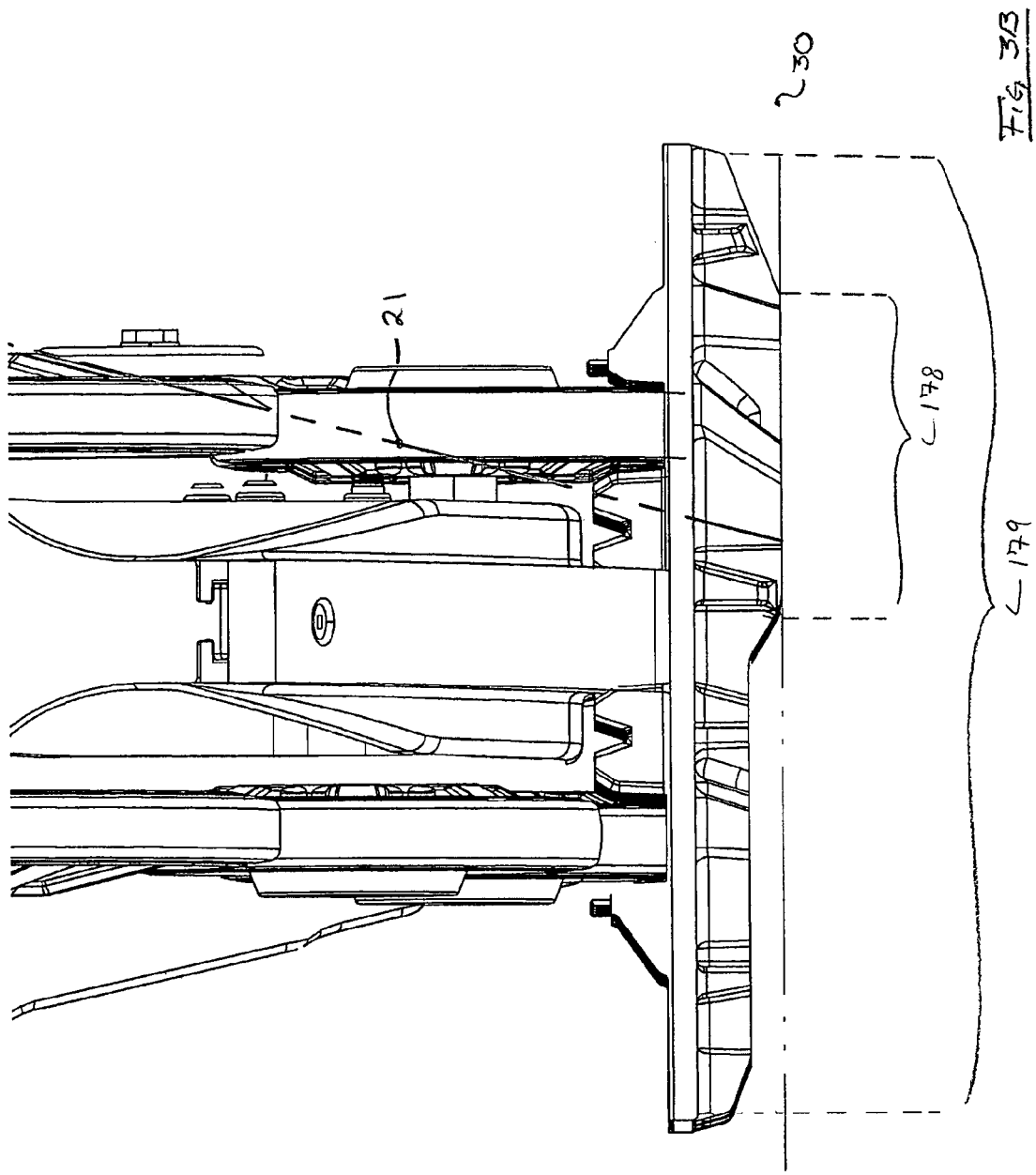
FIG. 3/3

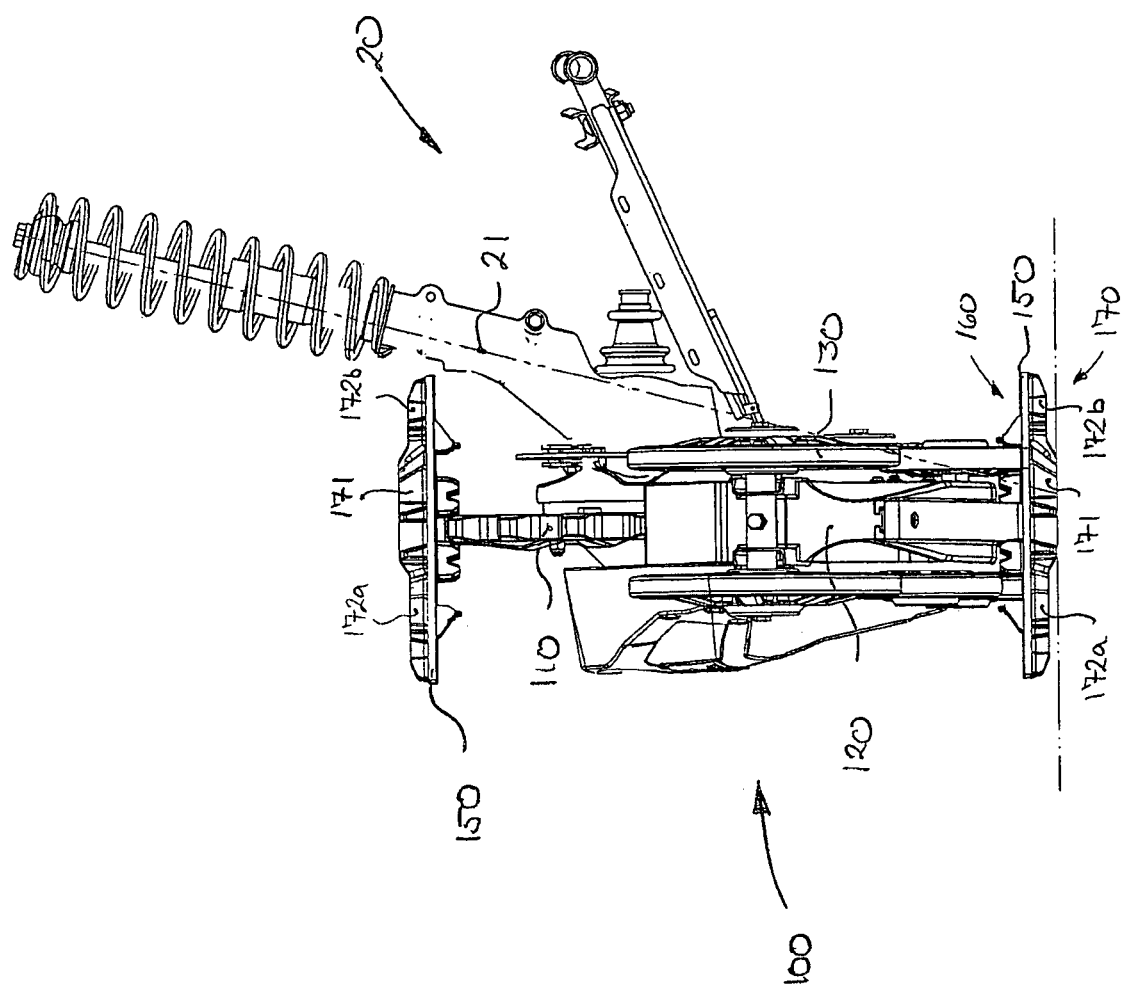

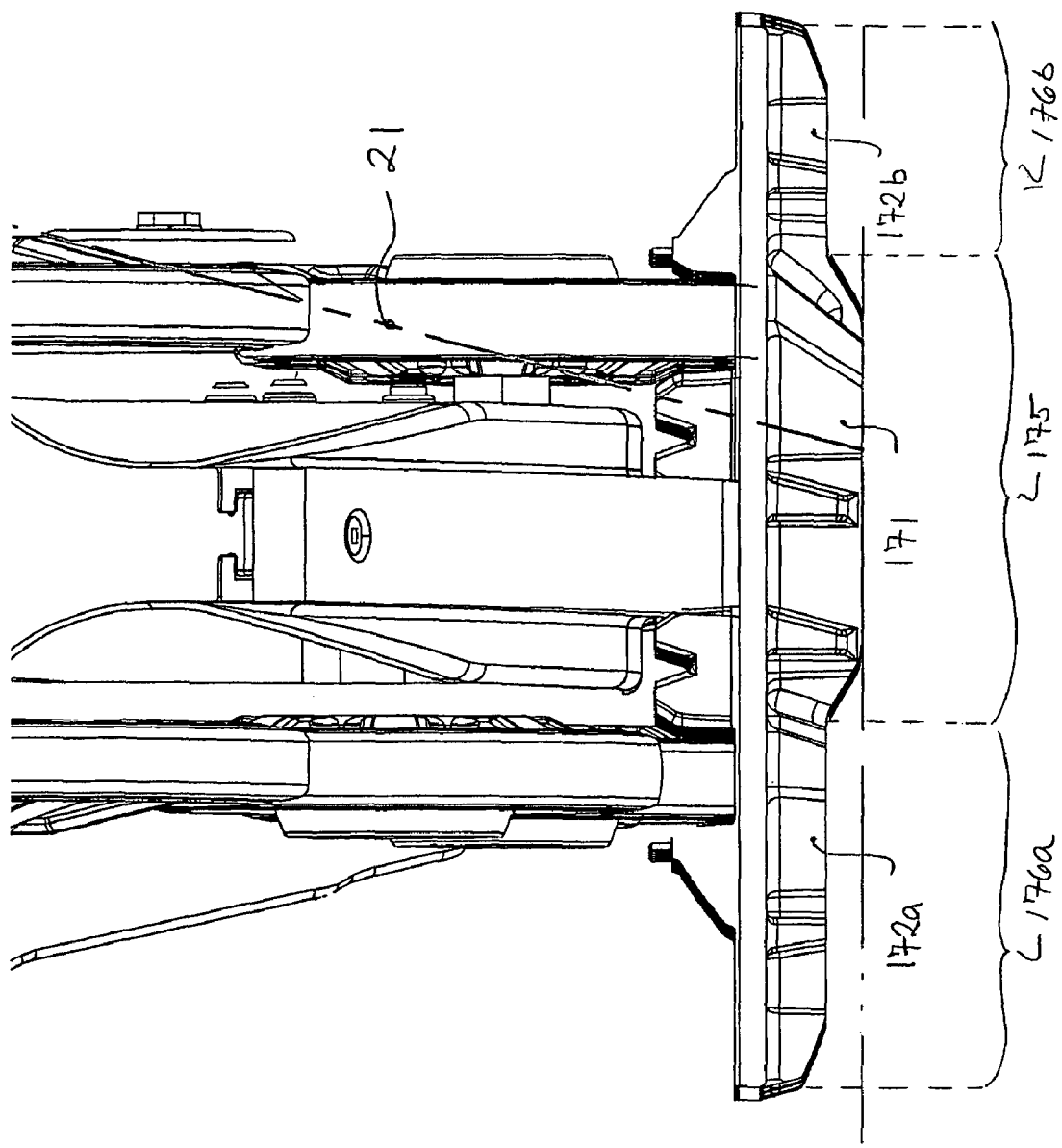

TRACTION ASSEMBLY WITH ENDLESS TRACK HAVING VARIABLE GROUND-CONTACTING AREA

CROSS-REFERENCE TO RELATED APPLICATIONS

The present patent application claims the benefits of priority of commonly assigned Canadian Patent Application No. 2,619,542, entitled "Traction Assembly with Endless Track Having Variable Ground-Contacting Area" and filed at the Canadian Intellectual Property Office on Feb. 6, 2008.

FIELD OF THE INVENTION

The present invention generally relates to traction assemblies used as wheel replacements for wheeled vehicles. More particularly, the present invention relates to traction assemblies used as wheel replacements for the wheels that steer vehicles and to the endless tracks mounted thereon.

BACKGROUND OF THE INVENTION

Nowadays, there are an ever-increasing number of people who enjoy riding all-terrain vehicles and other similar off-road vehicles. In order to further adapt these vehicles to the increasing variety of terrains and surfaces onto which they are ridden, companies have started to offer traction assemblies which can be used to replace the wheels on these vehicles.

Generally, a traction assembly comprises a supporting frame, a sprocket wheel, idler and/or road wheels and an endless elastomeric track disposed therearound and cooperating therewith. By using an endless track instead of a regular tire, a traction assembly generally provides increased floatation and better traction to the vehicle since the ground contacting area, also referred to as the contact patch, of the endless track is generally significantly larger than the contact patch of a regular tire.

In short, the larger ground-contacting area of the endless track effectively spreads the weight of the vehicle over a larger area (i.e. increased floatation) and provides additional ground-engaging surface to the vehicle (i.e. increased traction).

Though the larger contact patch of the endless track of the traction assembly is generally a significant advantage when the vehicle is ridden over soft surfaces such as snow, mud or sand, the larger contact patch can become a hindrance when the vehicle is ridden over harder surfaces such as concrete, asphalt or pavement. Indeed, the larger contact patch generally implies more friction between the track and the ground, making the vehicle more difficult to steer and manoeuvre.

Therefore, there is a need for an improved traction assembly which generally mitigates the aforementioned shortcomings.

OBJECTS OF THE INVENTION

Accordingly, one of the main objectives of the present invention is to provide a traction assembly having an endless track which defines a generally small contact patch when ridden over hard surfaces but a large contact patch when ridden over soft surfaces.

Another object of the present invention is to provide a traction assembly having an endless track which outer ground-engaging surface comprises at least two laterally extending portions, one of which being provided with traction lugs which are higher than the traction lugs provided on the other portion or portions.

Other and further objects and advantages of the present invention will be obvious upon an understanding of the illustrative embodiments about to be described or will be indicated in the appended claims, and various advantages not referred to herein will occur to one skilled in the art upon employment of the invention in practice.

SUMMARY OF THE INVENTION

The aforesaid and other objectives of the present invention are realized by generally providing a traction assembly comprising a novel endless track which provides a large contact patch when ridden over soft surfaces (e.g. snow, mud, sand and the like) but a small contact patch when ridden over hard surfaces (e.g. pavement, concrete and the like).

The traction assembly of the present invention generally comprises a sprocket wheel which is adapted to be mounted to the vehicle, preferably on the wheel hub thereof. The traction assembly also generally comprises a support structure which preferably, but not necessarily, supports idlers wheels and/or road wheels. The traction assembly also comprises a longitudinally extending endless elastomeric track disposed around and cooperating with the sprocket wheel, the support structure and, if any, the idler and/or road wheels.

The endless track comprises an inner wheel-engaging surface and an outer ground-engaging surface. The outer ground-engaging surface, which is provided with a plurality of traction lugs, further defines at least two laterally extending portions extending along the circumference of the track. In accordance with the present invention, one of the laterally extending portions is provided with traction lugs, or portions thereof, which are generally higher than the traction lugs, or portions thereof, located on the other laterally extending portion or portions.

Consequently, when a vehicle equipped with the traction assembly of the present invention is ridden over a hard surface such as, but not limited to, concrete or pavement, only the higher traction lugs of the endless track will effectively engage the ground. Conversely, when the same vehicle is ridden over a soft surface such as, but not limited to, snow, mud or sand, all the traction lugs of the track will generally engage the ground since the higher traction lugs will at least partially penetrate into the soft surface, thereby allowing the smaller traction lugs to also engage the ground.

Since the contact patch of the endless track of the traction assembly is generally defined by the area effectively in contact with the ground at a given time, the contact patch defined by the higher traction lugs will be smaller than the contact patch defined by all the traction lugs.

Preferably, the laterally extending portion which is provided with higher traction lugs is positioned on the outer ground-engaging surface so that the contact patch defined by the higher traction lugs effectively in contact with the ground roughly approximates the contact patch of a regular tire.

Preferably, the laterally extending portion which is provided with higher traction lugs is positioned on the outer ground-engaging surface so that the contact patch defined by the higher traction lugs is generally intersected by the steering axis of the suspension and steering system to which the traction assembly is mounted.

Consequently, by providing an endless track which has a smaller contact patch when used on hard surfaces, the traction assembly of the present invention is generally easier to steer and manoeuvre.

The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which:

FIG. 2 is a front partial cross-sectional view of the traction assembly of FIG. 1, showing an embodiment of the endless track.

FIGS. 3A and 3B are enlarged views of the lower run of the endless track shown in FIG. 2.

FIG. 4 is a front partial cross-sectional view of the traction assembly of FIG. 1, showing another embodiment of the endless track.

FIG. 5 is an enlarged view of the lower run of the endless track shown in FIG. 4.

DETAILED DESCRIPTION OF THE PREFERRED EMBODIMENT

A novel traction assembly will be described hereinafter. Although the invention is described in terms of specific illustrative embodiments, it is to be understood that the embodiments described herein are by way of example only and that the scope of the invention is not intended to be limited thereby.

Figure 1:
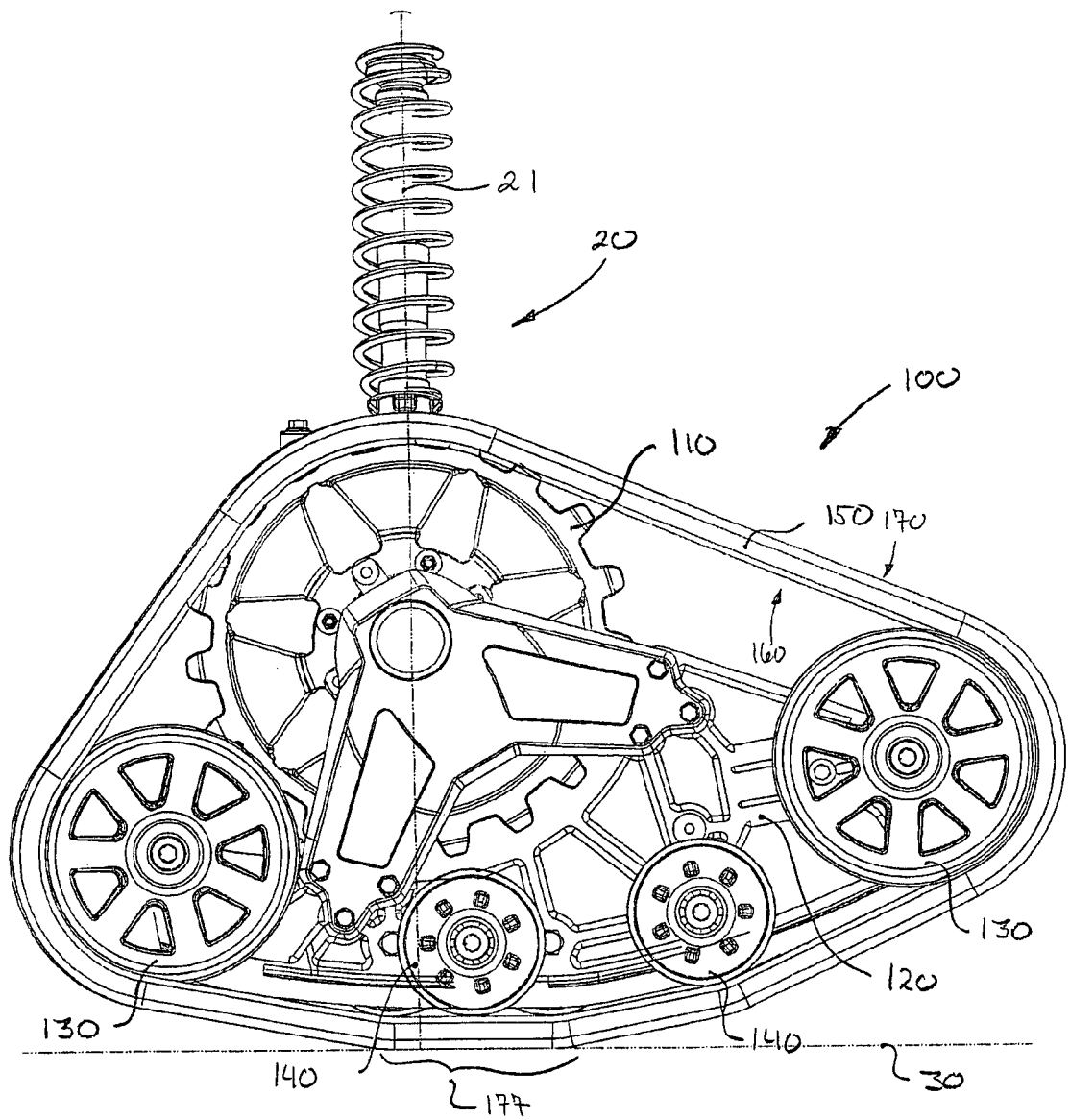
FIG. 1 is a side view of an exemplary traction assembly, in accordance with the present invention, as installed on an ATV.

Referring first to FIG. 1, a traction assembly 100, in accordance with the present invention, generally comprises a sprocket wheel 110 adapted to be fixedly mounted to the wheel hub or axle which is generally operationally connected to the suspension and/or steering system 20 of a vehicle (not shown). The traction assembly 100 also comprises a supporting frame structure 120 to which idler wheels 130 and road wheels 140 are preferably pivotally mounted. The idler wheels 130 are preferably respectively mounted at the fore and at the aft of the supporting frame 120 while the road wheels 140 are generally mounted along the frame 120, between the front and rear idler wheels 130. Finally, disposed around the sprocket wheel 110, the idler wheels 130, the road wheels 140 and the supporting frame 120 is a longitudinally extending endless track 150 made preferably of reinforced elastomeric material. Though not shown, the endless track 150 is preferably provided with at least one row of longitudinally aligned holes adapted to be engaged by the sprocket wheel 110. Other configurations are however possible; the present invention is not so limited.

Referring now to FIG. 2, the endless track 150 generally defines an inner wheel-engaging surface 160 and an outer ground-engaging surface 170. The inner wheel-engaging surface 160 is preferably provided with guide lugs 161 and 163 which are adapted to guide the endless track 150 and to prevent lateral movement thereof. Other configurations are also possible; the present invention is not so limited.

The ground-engaging surface 170 is provided with a plurality of generally laterally extending tractions lugs 171 and 172 which are disposed along the circumference of the track 150.

Figure 3A:
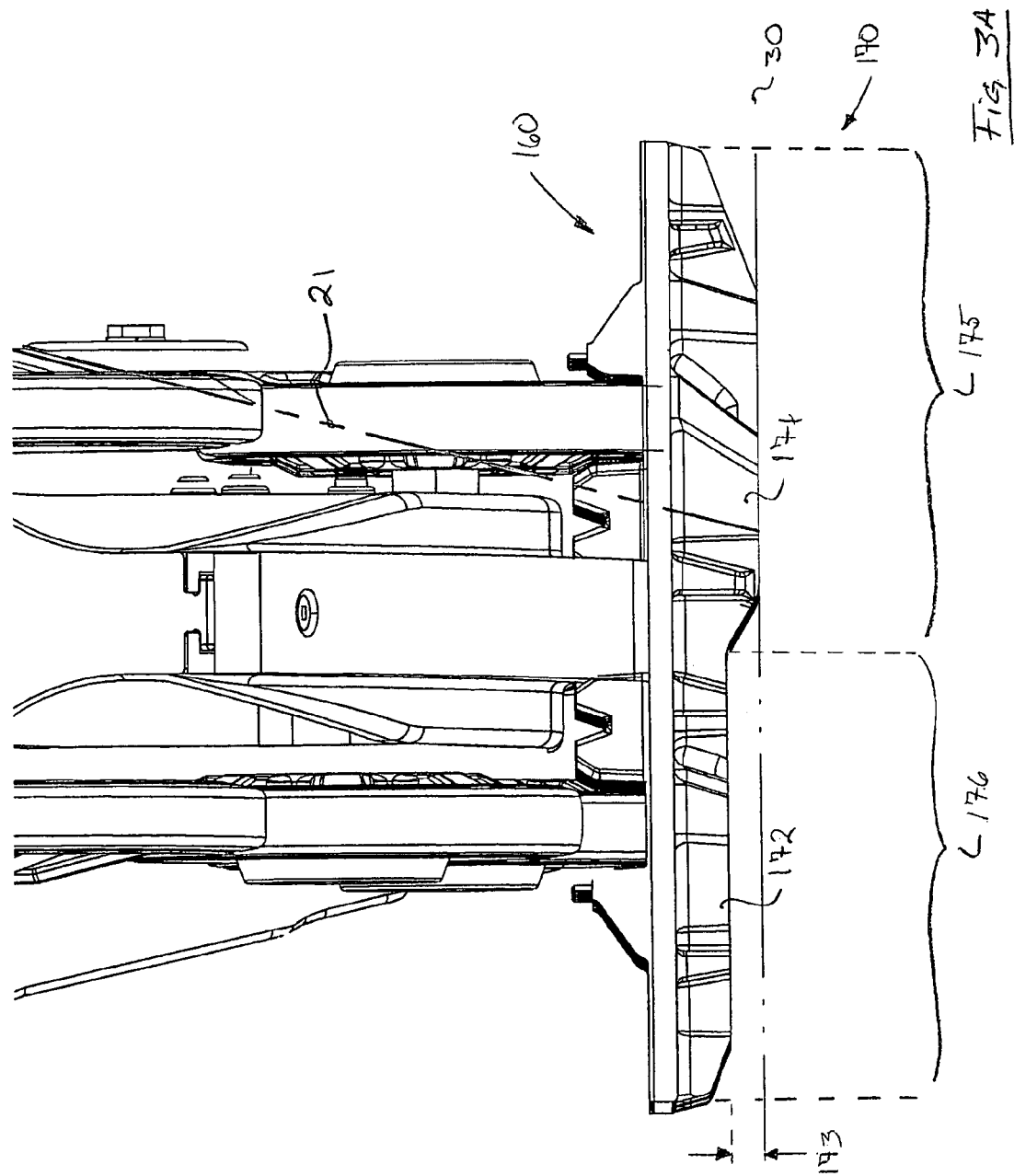

In accordance with the present invention and as best shown in FIG. 3A, the outer surface 170 comprises at least a first laterally extending portion or region 175 and a second laterally extending portion or region 176. The traction lugs 171, or portions thereof, located on the first laterally extending portion 175 are higher by a distance 173 than the traction lugs 172, or portions thereof, located on the remainder of the outer surface 170, hence, on the second laterally extending portion 176.

By providing the endless track 150 with traction lugs 171 and 172 having different heights, the track 150 generally defines two ground-contacting areas or contact patches. Indeed, when the vehicle is ridden over hard surfaces such as, but not limited to, concrete and pavement, only the higher traction lugs 171 will effectively contact the ground 30 as shown in FIGS. 3A and 3B. However, when the vehicle is ridden over soft surfaces such as, but not limited to, snow, mud and sand, both traction lugs 171 and 172 will effectively contact the ground since the higher traction lugs 171 will at least partially penetrate into the soft surface, thereby allowing traction lugs 172 to also contact the ground.

Accordingly, when the vehicle is ridden over hard surfaces, the ground-contacting area of the track 150 is the area generally defined by the length 177 shown in FIG. 1 and by the width 178 shown in FIG. 3B whereas when the vehicle is ridden over soft surfaces, the ground-contacting area of the track 150 is the area generally defined by the length 177 shown in FIG. 1 and by the width 179 shown in FIG. 3B. Since the width 178 is smaller than the width 179, the ground-contacting area of the track 150 defined by the length 177 and by the width 178 is correspondingly smaller.

Accordingly, depending on the type of surface over which the vehicle is ridden, the endless track 150 of the traction assembly 100 will have different ground-contacting areas; smaller when the surface is hard, larger when the surface is soft. By having a smaller ground-contacting area when the vehicle is ridden over hard surfaces, the endless track 150 will generate less friction and the traction assembly 100 will be easier to steer and manoeuvre. However, by having a larger ground-contacting area when the vehicle is ridden over soft surfaces, the endless track 150 will still generate increased floatation and traction, as in prior art traction assemblies.

Preferably, the distance 173 between the tractions lugs 171 and 172 is chosen so that despite the normal wear of the higher traction lugs 171 over the lifespan of the endless track 150, the distance 173 will remain significant enough to provide two different contact patches.

Preferably, but not necessarily, as shown in FIGS. 1, 3A and 3B, the position of the first laterally extending portion 175 along the width of the endless track 150 is chosen so that the ground-contacting area defined by the length 177 and by the width 178 is intersected by the steering axis 21 of the suspension and steering system 20 of the vehicle onto which the traction assembly 100 is mounted. When the first laterally extending portion 175 is so positioned, the ground-contacting area defined by the length 177 and by the width 178 will generally roughly approximate the ground-contacting area of the tire replaced by the traction assembly 100.

In the preferred embodiment shown in FIGS. 2, 3A and 3B, the first laterally extending portion 175 is preferably positioned to be essentially adjacent to the lateral side of the endless track 150 which is nearer the vehicle when the traction assembly 100 is mounted thereto. However, as the skilled addressee would understand and as shown in FIGS. 4 and 5, depending on the exact constructions of the traction assembly 100, of the endless track 150 and of the vehicle, the first laterally extending portion 175 could be positioned elsewhere along the width of the endless track 150. In that case, the first laterally extending portion 175 would generally be interposed between a second laterally extending portion 176a and a third laterally extending portion 176b comprising respectively traction lugs 172a and 172b. Understandably, in accordance with the present invention, the traction lugs 171 of the first laterally extending portion 175 would be higher than the traction lugs 172a and 172b of the second and third laterally extending portions 176a and 176b. However, the traction lugs 172a and 172b need not to be at the same height.

Additionally, though the endless track 150 shown herein comprises only one laterally extending portion having higher traction lugs, the present invention is not so limited and the endless track 150 could possibly comprise more than one such laterally extending portion.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A traction assembly for replacing a steerable wheel on a vehicle, said vehicle comprising a steering assembly for steering said steerable wheel, said steering assembly having a steering axis, said traction assembly comprising a sprocket wheel, a support frame and a longitudinally extending endless track disposed around and cooperating with said sprocket wheel and said support frame, said endless track comprising an inner wheel-engaging surface and an outer ground-engaging surface, said ground-engaging surface being provided with traction lugs and defining a first laterally extending portion extending longitudinally along a circumference of said track, and a second laterally extending portion extending longitudinally along said circumference of said track, wherein said traction lugs, or portions thereof, located on said first laterally extending portion are substantially higher than said traction lugs, or portions thereof, located on said second laterally extending portion, such that said traction lugs, or portions thereof, located on said first laterally extending portion define a first ground-contacting area, and said traction lugs, or portions thereof, located on both of said first and second laterally extending portions define a second ground-contacting area, wherein said first ground-contacting area is smaller than said second ground-contacting area and wherein said first laterally extending portion is located on said ground-engaging surface such that said steering axis intersects said first ground-contacting area when said traction assembly is mounted to said steering assembly of said vehicle.

2. A traction assembly as claimed in claim 1, wherein said first laterally extending portion is located nearer said vehicle than said second laterally extending portion when said traction assembly is mounted to said vehicle.

3. A traction assembly as claimed in claim 1, wherein said ground-engaging surface further defines a third laterally extending portion extending longitudinally along said circumference of said track, and wherein said traction lugs, or portions thereof, located on said first laterally extending portion are substantially higher than said traction lugs, or portions thereof, located on said third laterally extending portion.

4. A traction assembly for replacing a steerable wheel on a vehicle, said vehicle comprising a steering assembly for steering said steerable wheel, said steering assembly having a steering axis, said traction assembly comprising:
a) a sprocket wheel adapted to be mounted to said vehicle;
b) a support structure;
c) idler wheels pivotally mounted to said support structure;
d) road wheels pivotally mounted to said support structure;
e) a longitudinally extending endless track disposed around and cooperating with said sprocket wheel, said idler wheels, said road wheels and said support structure, said endless track comprising an inner wheel-engaging surface and an outer ground-engaging surface, said ground-engaging surface being provided with traction lugs;
wherein said endless track comprises a first longitudinally extending lateral portion and a second longitudinally extending lateral portion; and
wherein a plurality of said traction lugs located on said first lateral portion are higher than said traction lugs located on said second lateral portion;
wherein said traction lugs located on said first lateral portion define a first ground-contacting area, and said traction lugs located on both of said first and second lateral portions define a second ground-contacting area, said first ground-contacting area being smaller than said second ground-contacting area; and
wherein said first lateral portion is located on said ground-engaging surface such that said steering axis intersects said first ground-contacting area when said traction assembly is mounted to said steering assembly of said vehicle.

5. A traction assembly as claimed in claim 4, wherein said first lateral portion is located nearer said vehicle than said second lateral portion when said traction assembly is mounted to said vehicle.

6. A traction assembly as claimed in claim 4, wherein said ground-engaging surface comprises a third longitudinally extending lateral portion and wherein said plurality of said traction lugs located on said first lateral portion are substantially higher than said traction lugs located on said third lateral portion.

7. An endless track for use in cooperation with a traction assembly suitable for replacing a steerable wheel on a vehicle, said vehicle comprising a steering assembly for steering said steerable wheel, said steering assembly having a steering axis, said traction assembly comprising a sprocket wheel and a support structure, said endless track comprising an inner wheel-engaging surface and an outer ground-engaging surface, said outer ground-engaging surface being provided with a plurality of circumferentially disposed traction lugs and defining a first circumferentially extending lateral portion and a second circumferentially extending lateral portion, wherein said traction lugs, or portions thereof, located on said first lateral portion are substantially higher than said traction lugs, or portions thereof, located on said second lateral portion such that said traction lugs, or portions thereof, located on said first lateral portion define a first ground-contacting area, and said traction lugs, or portions thereof, located on both of said first and second lateral portions define a second ground-contacting area, wherein said first ground-contacting area is smaller than said second ground-contacting area and wherein said first lateral portion is located on said ground-engaging surface such that said steering axis intersects said first ground-contacting area when said traction assembly, to which said endless track is mounted in cooperation, is mounted to said steering assembly of said vehicle.

8. An endless track as claimed in claim 7, wherein said outer ground-engaging surface further defines a third circumferentially extending lateral portion and wherein said traction lugs, or portions thereof, located on said first lateral portion are substantially higher than said traction lugs, or portions thereof, located on said third lateral portion.

9. An endless track as claimed in claim 7, wherein said endless track comprises a first and a second lateral sides and wherein said first lateral portion is located substantially adjacent to one of said first and second lateral sides.

10. A traction assembly for replacing a steerable wheel on a vehicle, said vehicle comprising a steering assembly for supporting and steering said steerable wheel, said steering assembly having a steering axis, said traction assembly comprising a sprocket wheel adapted to be mounted to said steering assembly, a support frame, and a longitudinally extending endless track disposed around and cooperating with said sprocket wheel and said support frame, said endless track comprising a first lateral side, a second lateral side, an inner wheel-engaging surface and an outer ground-engaging surface, said ground-engaging surface comprising a plurality of traction lugs, said ground-engaging surface defining at least a first laterally extending region extending longitudinally along a circumference of said track, and a second laterally extending region extending longitudinally along said circumference of said track, wherein a plurality of said traction lugs, or portion thereof, located on said first laterally extending region are substantially higher than said traction lugs, or portion thereof, located on said second laterally extending region, such that said traction lugs, or portion thereof, located on said first laterally extending region define a first ground-contacting area, and said traction lugs, or portion thereof, located on both of said first and second laterally extending regions define a second ground-contacting area, wherein said first ground-contacting area is smaller than said second ground-contacting area, and wherein said first laterally extending region is located on said ground-engaging surface such that said first ground-contacting area is intersected by said steering axis.

11. A traction assembly as claimed in claim 10, wherein each of said traction lugs, or portions thereof, located on said first laterally extending region is substantially higher than said traction lugs, or portions thereof, located on said second laterally extending region.

12. A traction assembly as claimed in claim 10, wherein said first laterally extending region is located adjacent to one of said first and second lateral sides, and wherein said second laterally extending region is located adjacent to the other of said first and second lateral sides.

13. A traction assembly as claimed in claim 10, wherein said ground-engaging surface further defines at least a third laterally extending region extending longitudinally along said circumference of said track, and wherein said plurality of said traction lugs, or portion thereof, located on said first laterally extending region are substantially higher than said traction lugs, or portion thereof, located on said third laterally extending region.

14. A traction assembly as claimed in claim 13, wherein each of said traction lugs, or portions thereof, located on said first laterally extending region is substantially higher than said traction lugs, or portions thereof, located on said third laterally extending region.

15. A traction assembly as claimed in claim 13, wherein said second laterally extending region is located adjacent to one of said first and second lateral sides, wherein said third laterally extending region is located adjacent to the other of said first and second lateral sides, and wherein said first laterally extending region is located between said second and third laterally extending regions.

16. A traction assembly for replacing a steerable wheel on a vehicle, said vehicle comprising a steering assembly for supporting and steering said steerable wheel, said steering assembly having a steering axis, said traction assembly comprising a sprocket wheel adapted to be mounted to said steering assembly, a support frame, and a longitudinally extending endless track disposed around and cooperating with said sprocket wheel and said support frame, said track comprising a first lateral side and a second lateral side, said first and second lateral sides defining a width of said track, said track comprising an inner wheel-engaging surface and an outer ground-engaging surface, said ground-engaging surface comprising a plurality of traction lugs, said ground-engaging surface defining at least one laterally extending region extending longitudinally along a circumference of said track wherein each of said traction lugs, or portions thereof, located on said at least one laterally extending region is substantially higher than said traction lugs, or portions thereof, located laterally outside of said at least one region, said traction lugs, or portions thereof, located on said at least one region defining a first ground-contacting area, and said traction lugs located on said at least one region and laterally outside said at least one region defining a second ground-contacting area, wherein said first ground-contacting area is smaller than said second ground-contacting area, and wherein said at least one region is located on said ground-engaging surface such that said first ground-contacting area is intersected by said steering axis.

17. A traction assembly as claimed in claim 16, wherein said at least one region is located adjacent to one of said first and second lateral sides.

\* \* \* \* \*